Dec. 3, 1935. P. C. HERMANN 2,023,228
MAGNETIC FLUX GENERATION AND MAGNETIC TESTING
Filed Feb. 23, 1934
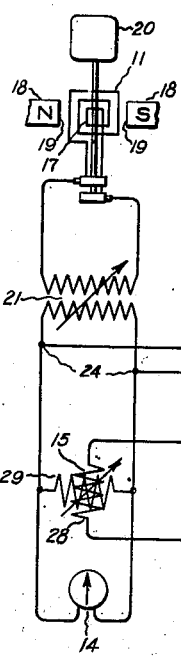
Fig. 1.
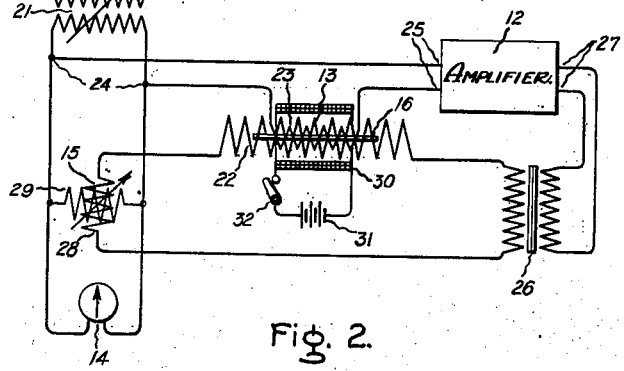
Fig. 2.
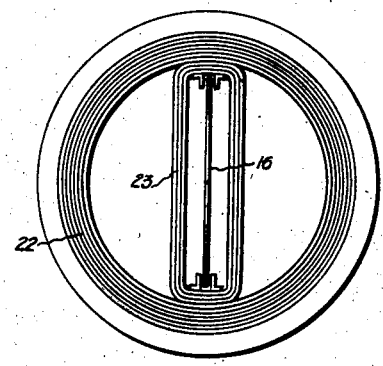
Fig. 3.
Fig 4.
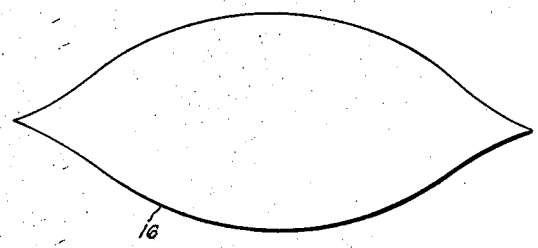
Inventor:
Peter C. Hermann,
by Harry E. Dunham
His Attorney Patented Dec. 3, 1935

2,023,228

UNITED STATES PATENT OFFICE 2,023,228

MAGNETIC FLUX GENERATION AND MAGNETIC TESTING

Peter C. Hermann, Berlin-Zehlendorf, Germany, assignor to General Electric Company, a corporation of New York Application February 23, 1934, Serial No. 712,663
In Germany April 6, 1933

10 Claims. (Cl. 175—183)

My invention relates to improvements in magnetic flux generation and magnetic testing.

Alternating current magnetic tests are preferably carried out under conditions which result in the flux wave produced in the test specimen conforming substantially to a sine wave. In measuring core loss, for instance, it is essential to an accurate determination of the flux density or strength of the magnetic induction for which the test is carried out that the variations in flux conform to a sine wave. In cases where sufficient test material is available to build up closed cores having an appreciable volume in comparison with the dimensions of the exciting winding and low resistance exciting windings are used, the magnetic flux in the core will follow the voltage applied to the exciting winding closely enough in wave form so that, for practical purposes, a satisfactory result is obtained by energizing the exciting windings from a sine wave generator. However, when testing small specimens, such as single strips of magnetic material, for example, too much distortion takes place between the wave form of the voltage applied to the exciting windings, and the flux wave in the test specimen.

It is an object of my invention to provide a method and apparatus for generating a magnetic flux closely following a sine wave form, and it is also an object to provide apparatus for making a magnetic test in which a sine wave of flux is utilized.

Another object of my invention is to provide an apparatus for measuring core loss and other magnetic properties in small specimens of magnetic material.

Other and further objects and advantages will become apparent as the description proceeds.

In accordance with my invention in its preferred form, I am enabled to produce substantially a sine wave of flux in a specimen of magnetic material by so distorting the current flowing in the exciting windings that the desired wave form is obtained. In order to accomplish this result, I connect a flux detecting coil in series with the output terminals of a sine wave generator and the input terminals of an amplifier and supply the exciting current from the output terminals of the amplifier so that any discrepancies in wave form between the voltage induced in the detecting coil and the voltage of the sine wave generator result in the production in the amplifier of the harmonics required to distort properly the exciting current.

The features of my invention which I believe to be novel and patentable will be pointed out in the claims appended hereto.

A better understanding of my invention, itself, however, may be obtained by referring to the following description taken in connection with the accompanying drawing in which Fig. 1 is a schematic diagram representing the arrangement and the electrical circuits of the apparatus which forms one embodiment of my invention; Fig. 2 is a cross-sectional view of the magnetizing winding and the apparatus supported therein; Fig. 3 represents a shape of test specimen which may advantageously be tested in apparatus constructed in accordance with my invention; and Fig. 4 is a graph representing the relationship between magnetizing force, flux density, and core loss.

My invention relates broadly to a method of and apparatus for generating substantially a sine wave of magnetic flux. The apparatus may be used to advantage in making core loss and other magnetic tests on small specimens of magnetic material in strip form and my invention will be described in connection with such testing apparatus, but it will be understood that it is not limited thereto.

Referring now more in detail to the drawing in which like reference characters refer to like parts throughout, the apparatus shown in Fig. 1 includes a sine wave generator 11 connected through an amplifier 12 to the test transformer 13. A voltmeter 14 and a wattmeter 15 provide indications of the flux density and the core loss, respectively, of a test specimen 16 forming the magnetic core of the test transformer 13.

The sine wave generator 11 may be of any desired type but since my apparatus is so constructed that only negligible current is drawn from the sine wave generator 11, the problem of designing the generator 11 in such a manner that a true sine wave of voltage is obtained is materially simplified. The simplest method of insuring a pure sine wave is to utilize a rotating armature such as the armature 17 having an air core and rotating between magnetic pole pieces 18 having flat parallel pole faces 19. If desired, such a generator may be utilized in connection with my apparatus since no appreciable load is placed upon the generator. The desired frequency for testing the specimen 16 is obtained by driving the generator 11 by means of the motor 20 at the appropriate speed as will be well understood by those skilled in the art. If desired, a variable ratio transformer 21 may be connected between the armature 17 of the sine wave generator 11 and the remainder of the testing apparatus.

The test transformer 13 comprises the primary or exciting winding 22, a secondary winding or detecting coil 23, and the magnetic core constituted by the test specimen 16. The output terminals 24 of the transformer 21 are connected in series with the secondary winding 23 of the test transformer 13 and the input terminals 25 of the amplifier 12.

The test specimen 16 may, if desired, or if necessary, consist of only a single lamination or a portion of a sheet of magnetic material. For the sake of obtaining greater uniformity of magnetization in the specimen 16, it may be made lancet shaped as shown in Fig. 3, being placed with its longitudinal axis parallel with the axes of the windings 22 and 23. The fact that the specimen 16 is tapered at the ends overcomes the tendency toward reduction in flux density in the ends of the specimen produced by the tendency of the lines of flux to spread or diverge at the ends of the specimen.

If desired, an intermediate transformer 26 may be interposed between the output terminals 27 of the amplifier 12 and the exciting winding 22 of the test transformer 13. The circuit of the exciting winding 22 includes the current coil 28 of the wattmeter 15. The potential coil 29 of the wattmeter 15 is connected in parallel with the voltmeter 14 to the output terminals 24 of the variable ratio transformer 21. It will be understood that the instruments 14 and 15 are so constructed as to draw only negligible current from the sine wave generator 11. If desired, these instruments may be of the vacuum tube type but since the type of instrument employed does not form a part of my invention, they are not described in detail but merely indicated schematically.

If desired, an auxiliary exciting winding 30 may be employed to facilitate making tests with a displaced flux wave in the test specimen 16. The winding 30 is connected in series with a source of direct current 31 and a control switch 32.

The amplifier 12 may be of any desired type, such as, for example, a vacuum tube amplifier, and is preferably one providing a relatively high degree of amplification. It will be understood that the amplifier 12 is to be so connected as to have the proper polarity to prevent regeneration or feeding back of energy owing to the mutual inductance of coils 22 and 23.

In general, the operation of my apparatus depends upon the fact that the voltage induced in the secondary or induction responsive winding 23 of the test transformer 13 and which necessarily conforms to the shape of the flux wave in the specimen 16 is balanced against the sine wave voltage appearing at the terminals 24 of the transformer 21 so that any differences between the two voltages are amplified by the amplifier 12 and produce currents of the distorted wave form required to generate substantially sine wave flux in the core 16.

The mathematical relationship between the flux waves will be understood more readily from the following formulae. If $e_1$ is the instantaneous value of the sine wave voltage supplied by the sine wave generator 11 and appearing at the terminals 24, $e_2$ is the voltage induced in the induction winding 23, and $e_3$ is the input voltage to the terminals 25 of the amplifier 12, then $$e_3 = e_1 - e_2$$

If $i$ is the magnetizing current flowing in the magnetizing winding 22 and $S$ is the factor representing the degree of amplification of the amplifier 12, then $$i = Se_3$$

The interlinkage between the windings 22 and 23 by means of the test specimen 16 is represented by the formula $$i = f(e_2)$$

where the symbol $f(e_2)$ indicates "a function of $e_2$". Eliminating the quantities $i$ and $e_3$ from the foregoing equations gives the equation $$e_1 = e_2 + \frac{f(e_2)}{S}$$

Consequently, if $S$ is made sufficiently large, the quantity $$\frac{f(e_2)}{S}$$

becomes negligible and the wave forms of $e_1$ and $e_2$ substantially coincide. In this manner a substantially sinusoidal flux wave is obtained in spite of the small size of the test specimen. In consequence of the coincidence in wave form of $e_1$ and $e_2$, the value of $e_2$ may be determined by measuring the voltage $e_1$. This permits connecting the instruments for greater sensitivity without placing any greater load on the source of sine wave voltage or distorting the flux wave.

The power input to the magnetic core formed by the specimen 16 is, of course, the vector product of the current and voltage inputs, or the average value of the products of the instantaneous values of the current and voltage inputs to the winding 22 less the electrical losses. The electrical losses are eliminated by taking as useful voltage input, the back voltage in winding 22, which (corrected for ratio of transformation if the numbers of turns in windings 22 and 23 are not equal) equals the voltage $e_2$ induced in winding 23, which, in turn, as has been shown, substantially equals $e_1$, the voltage between terminals 24. Accordingly, the magnetic power input is indicated by the wattmeter 15 which gives the vector product of the voltage at terminals 24 and the current in winding 22. The value of the magnetic induction and the flux density in the specimen 16 are readily calculated from the voltage between terminals 24 corresponding to that induced in winding 23, and from the cross-section of the specimen 16 as is well understood by those skilled in the art.

Referring to Fig. 4 in which the curves 33 and 34 represent the relationship between the flux density and magnetizing force with descending and ascending values of magnetizing force, respectively, it will be seen that, at the extremities of the curves, the slopes are materially different than in the intermediate portions, representing the effect of saturation. In making magnetic tests carried up to or beyond the point of saturation, which normally result in distortion between the voltage applied to a magnetizing coil and the magnetic flux induced in a magnetic core, it will be seen that errors in the measurements would result if means were not employed to insure that the flux wave conformed to a sine curve.

My apparatus is, therefore, particularly of value in connection with magnetic cores of any size where the test is to be extended into or beyond the range of saturation of the magnetic core. As will be readily understood by those skilled in the art, the area between the curves 33 and 34 represents the power loss when subjecting the magnetic material to the magnetization and demagnetization cycle represented by the hysteresis loop 33—34. Where loss measurements are to be made corresponding to displaced hysteresis loops, such as the loop 35 or the loop 36, my apparatus is also particularly advantageous since it assures the continuance of the sine wave shape for the magnetizing flux. Displaced loops, such as loops 35 and 36 occur, of course, when the magnetizing cycle is such that the maximum magnetizing force in one direction does not equal the maximum value of magnetizing force in the opposite direction, that is, when there is a direct current component in the magnetizing current. When making such tests with displaced hysteresis loops, the direct current component may, if desired, be supplied by means of the supplementary winding 30.

In accordance with the provisions of the patent statutes, I have described the principle of operation of my invention together with the apparatus which I now believe to represent the best embodiment thereof, but I desire to have it understood that the apparatus shown and described is only illustrative and that my invention may be carried out by other arrangements.

What I claim as new and desire to secure by Letters Patent of the United States, is:—

1. Apparatus for producing a sine wave of magnetic flux which comprises in combination a generator of a sine wave of voltage, an amplifier and a transformer composed of primary and secondary windings and a magnetic core in which said sine wave of flux is to be produced, said amplifier having input terminals connected to said sine wave voltage generator and said secondary winding in series and having output terminals connected to said primary winding whereby the voltage induced in said secondary winding serves to control said amplifier and cause its output to have the wave form required to produce substantially a sine wave of flux in said magnetic core.

2. Apparatus for measuring core loss in a specimen of magnetic material which comprises in combination a generator of a sine wave of voltage, an amplifier, a transformer composed of primary and secondary windings adapted to receive said specimen of magnetic material in inductive relation, and a power responsive instrument having current and voltage terminals, said amplifier having input terminals connected to said sine wave voltage generator and said secondary winding in series and having output terminals connected to said primary winding in series with the current terminals of said power responsive instrument, the voltage terminals of said power responsive instrument being connected in parallel with the output terminals of said sine wave generator whereby the voltage induced in said secondary winding serves to control said amplifier and cause its output to have the wave form required to produce substantially a sine wave of flux in said magnetic core, and said power responsive instrument is caused to respond to the magnitude of the energy dissipated in said specimen of magnetic material.

3. A method of testing sheet magnetic material which comprises taking a lancet shaped portion of such sheet, subjecting it to the influence of a magnetic field, and measuring the magnetic induction therein.

4. A method of testing a specimen of magnetic material which comprises subjecting said specimen to the influence of a magnetic field having a wave form distorted in the manner required to induce substantially a sinusoidal flux wave in said specimen.

5. A method of testing a specimen of magnetic material which comprises producing a voltage proportional to the difference between a sinusoidal voltage and a voltage conforming to the wave form of magnetic flux in said specimen, amplifying said difference voltage to produce a current conforming thereto in wave shape, producing a magnetic field by means of said current and subjecting said specimen to said field.

6. A method of determining the core loss of a specimen of magnetic material which comprises subjecting said specimen to a magnetic field produced by a current having the wave form required to produce a substantially sinusoidal flux in said specimen, inducing a voltage by means of said flux and obtaining the vectorial product of said voltage and said magnetizing current.

7. A method of producing a magnetic flux of substantially sinusoidal wave form in a core of magnetic material which comprises producing a voltage having a wave form corresponding to the difference between the flux wave in said core and a sinusoidal wave, amplifying said difference in voltage to produce a current conforming thereto in wave shape, producing a magnetic field by means of said current and subjecting said core to said field, thereby supplying the components of magnetizing force required to maintain a substantially sinusoidal flux wave.

8. Apparatus for producing a magnetic flux of substantially sinusoidal wave form in a core of magnetic material, comprising in combination means for producing a sinusoidal voltage, opposing means for producing a voltage in response to variations in flux in said core, means for amplifying the difference between said voltages, means energized by said amplifying means for subjecting said core to a magnetic field conforming in wave form to said difference in voltage to produce therein a substantially sinusoidal flux.

9. An electromagnetic device comprising in combination, a magnetizing winding, a detector winding, and a lancet-shaped core of magnetic material in inductive relation with the longitudinal axis of said magnetizing winding and said core parallel, the shape of said core serving to promote uniformity of magnetization thereof.

10. A flux generator comprising in combination, a magnetizing winding, a detector winding and a lancet-shaped core of magnetic material in inductive relation, and an amplifier with input terminals in circuit with said detector winding and output terminals connected to said magnetizing winding, the longitudinal axis of said core being parallel to the axis of the magnetizing winding and the shape of said core serving to promote uniformity of magnetization thereof.

PETER C. HERMANN.